United States Patent
Zhang

(10) Patent No.: US 10,643,171 B1
(45) Date of Patent: May 5, 2020

(54) DYNAMIC ADJUSTMENT OF DELIVERY LOCATION BASED ON USER LOCATION

(71) Applicant: Google LLC, Mountain View, CA (US)

(72) Inventor: Yu Zhang, Coquitlam (CA)

(73) Assignee: Google LLC, Mountain View, CA (US)

( * ) Notice: Subject to any disclaimer, the term of this patent is extended or adjusted under 35 U.S.C. 154(b) by 1393 days.

(21) Appl. No.: 14/339,109

(22) Filed: Jul. 23, 2014

(51) Int. Cl.
    *G06Q 10/08* (2012.01)
(52) U.S. Cl.
    CPC .............................. *G06Q 10/08355* (2013.01)
(58) Field of Classification Search
    CPC .................................................. G06Q 10/08355
    See application file for complete search history.

(56) References Cited

U.S. PATENT DOCUMENTS

| | | | | |
|---|---|---|---|---|
| 6,618,582 | B1* | 9/2003 | Coons ................... | H04W 84/08 340/287 |
| 8,370,271 | B1* | 2/2013 | Robinson ............. | G06Q 10/083 705/26.7 |
| 2002/0010611 | A1* | 1/2002 | Yamaji ................ | G06Q 10/0631 705/7.12 |
| 2003/0065565 | A1* | 4/2003 | Wagner .................. | G06Q 10/08 705/15 |
| 2007/0192200 | A1* | 8/2007 | Weng ..................... | G06Q 30/06 705/26.35 |
| 2008/0046326 | A1* | 2/2008 | Horstemeyer ........ | B60R 25/102 705/14.69 |
| 2009/0012802 | A1* | 1/2009 | Pinney ................... | G06Q 10/08 705/330 |
| 2014/0156472 | A1* | 6/2014 | Stuntebeck .......... | G06Q 10/087 705/28 |
| 2015/0112886 | A1* | 4/2015 | Luan ...................... | G06Q 10/08 705/333 |
| 2015/0294266 | A1* | 10/2015 | Siragusa ............ | G06Q 10/0833 705/333 |
| 2015/0347964 | A1* | 12/2015 | Taylor .............. | G06Q 10/08355 705/26.3 |

OTHER PUBLICATIONS

Alam, Hisham, "Stand and deliver," Intelligent Enterprise, San Mateo: MultiMedia Healthcare Inc., 4.5, Mar. 27, 2001, pp. 44-48.*

* cited by examiner

*Primary Examiner* — Nathan Erb
(74) *Attorney, Agent, or Firm* — Dority & Manning, P.A.

(57) ABSTRACT

A user places an order on a merchant website associated with a merchant system via a user computing device. The user selects an option for delivery to the user computing device location within a delivery area during a delivery time window and authorizes a delivery system to log the location of the user computing device during and/or a period of time before the delivery time window. When the delivery time window arrives, the delivery system provides a delivery route to a delivery agent computing device. When the delivery agent arrives at the user computing device's location, the user receives an alert that the delivery agent has arrived and receives a package from the delivery agent. If the user does not remain within the delivery area, the user may cancel the order and the delivery, may reschedule the delivery, and/or may accept delivery of the order to a fixed shipping address.

16 Claims, 8 Drawing Sheets

DYNAMIC ADJUSTMENT OF DELIVERY LOCATION BASED ON USER LOCATION

TECHNICAL FIELD

The present disclosure relates generally to providing location-based services, and more particularly to providing a delivery to a user location.

BACKGROUND

Delivery to a fixed shipping address is not always convenient for a user when the user is accepting delivery in person. Because the user is often uncertain about the exact time that a delivery should arrive, the user may be inconvenienced by having to spend unnecessary time waiting for the delivery at the shipping address. In such a situation, a user may not feel at liberty to run an errand at a nearby location out of concern that the delivery could arrive while the user is away from the delivery address.

SUMMARY

Techniques herein provide a computer-implemented method to dynamically adjust a delivery location based on a location of a user computing device. In an example embodiment, a user places an order on a merchant website associated with a merchant system via a user computing device. The user selects an option for delivery to the user computing device location within a delivery area during a delivery time window. The user authorizes a delivery system to log the location of the user computing device during the delivery time window and/or before the delivery time window. When the delivery time window arrives, the delivery system provides, to a delivery agent via a delivery agent computing device, directions comprising a delivery route to reach the user computing device location. When the delivery agent arrives at the user computing device's location, the user receives an alert that the delivery agent has arrived and receives a package from the delivery agent. In other example embodiments, the user does not remain within the delivery area and is given an option to cancel the order and the delivery, an option to reschedule the delivery, and/or an option to accept delivery of the order at a fixed shipping address.

In certain other example aspects described herein, a system and a computer program product to dynamically adjust a delivery location based on a location of a user computing device are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
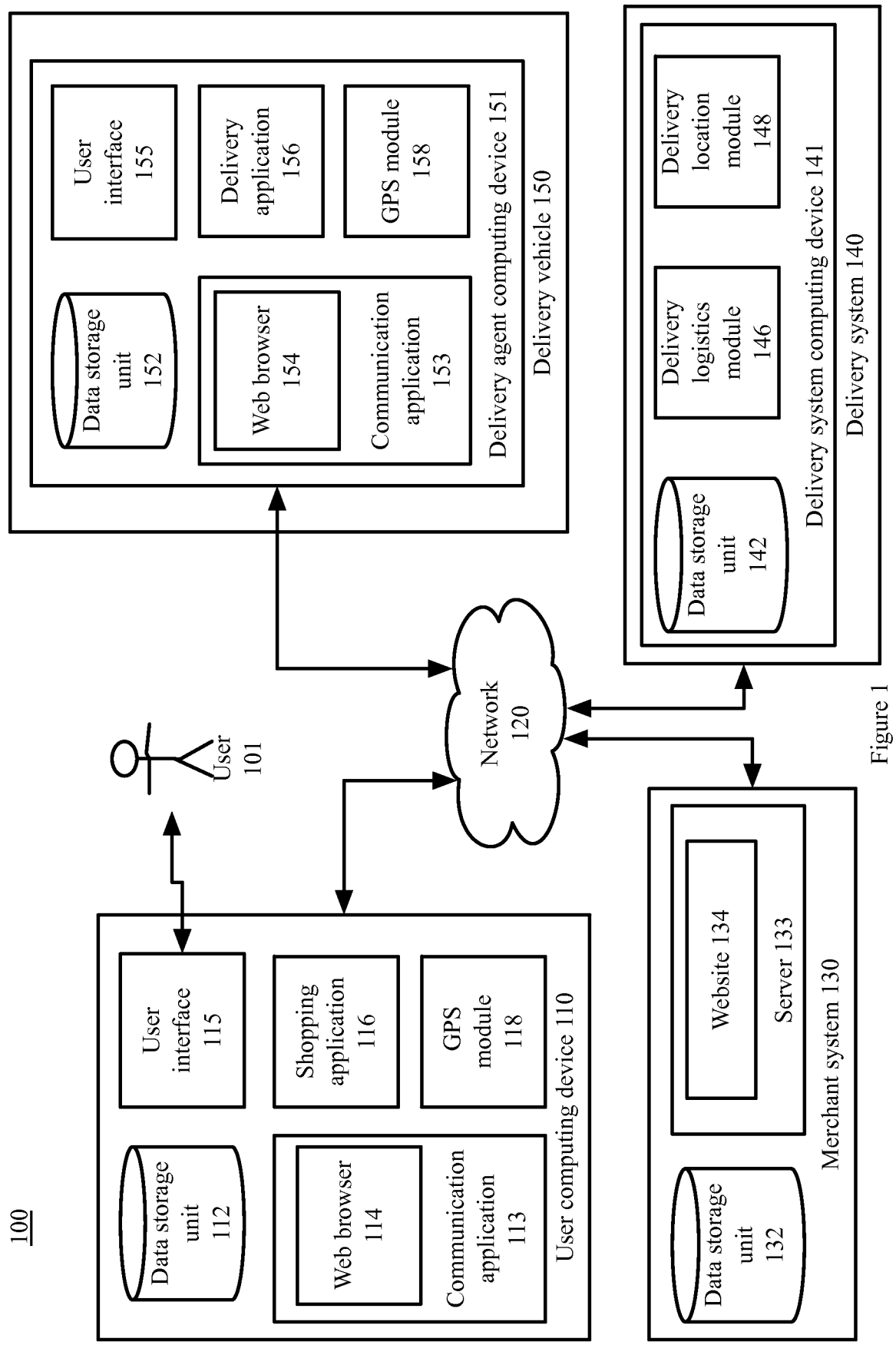
FIG. 1 is a block diagram depicting a system for dynamically adjusting a delivery location based on a location of a user computing device, in accordance with certain example embodiments.

The example embodiments described herein provide computer-implemented techniques for dynamically adjusting a delivery location based on a location of a user computing device. In an example embodiment, a user places an order on a merchant website associated with a merchant system via a user computing device. The user selects an option for delivery to the user computing device location within a delivery area during a delivery time window and authorizes a delivery system to log the location of the user computing device during and/or a period of time before the delivery time window. When the delivery time window arrives, the delivery system provides, to a delivery agent via a delivery agent computing device, directions to reach the user computing device location. When the delivery agent arrives at the user computing device's location, the user receives an alert that the delivery agent has arrived and receives a package from the delivery agent.

In an example embodiment, a user places an order with a merchant system. For example, the user accesses a merchant website associated with the merchant system via a user computing device. The user selects one or more products for purchase on the merchant website and provides financial account information to be used in a transaction. In an example embodiment, the user provides shipping information to the merchant website, selects a delivery time window, selects an option to deliver to the user computing device location at the time of delivery, confirms the shipping options, and places the order after being presented with a map of a delivery area. Example shipping information may comprise a name and physical address associated with the user, such as the user's residential address or business address. An example delivery time window may comprise a date and a range of time wherein the user should expect delivery. For example, a user selects a delivery time window of Friday, May 16, 2014 between 2:00 p.m. and 5:00 p.m. Eastern Daylight Time. An example delivery area may be a bounded physical area based on the physical address provided by the user or a maximum distance from the physical address in which the user and the user computing device should be present during the delivery time window so that delivery may be effected. An example delivery area may be presented to the user in a map format, a numerical maximum distance (for example, in miles or kilometers) from the physical address that the user may receive delivery, or any other appropriate format. The user authorizes the delivery system to log the location of the user computing device during the delivery time window and during a predefined time range prior to the delivery time window. In an example embodiment, if the user leaves the delivery area during the delivery time window, or is not present within the delivery area at the start of the delivery time window, the delivery system may decline to deliver a user's order. In this example, the delivery system may give the user the option to reschedule the delivery, cancel the order, or accept delivery at a new physical address provided by the user (upon request by the delivery system) or at the physical address previously provided by the user to the merchant website during checkout.

In an example embodiment, the user receives an alert on the user computing device that the delivery window is approaching. If the user is outside of the prescribed delivery area at a predefined time prior to the delivery time window, the delivery system transmits an alert to the user computing device that the user is outside of the delivery area. In an example, the user has the opportunity to reenter the delivery range before the delivery time window begins. If the delivery time window arrives and the user remains outside of the delivery area, the delivery system may give the user another opportunity to reenter the delivery area or may give the user the option to reschedule the delivery, the option to accept delivery at a fixed address provided by the user, and/or the option to cancel the order. If the user is within the delivery area when the delivery time window arrives, the user receives an alert on the user computing device from the delivery system that the delivery window has arrived.

The delivery system determines a route for the delivery agent based on the locations of the user computing device and the delivery agent device and transmits the delivery route to the delivery agent device. In an example, the delivery agent computing device is a portable computing device used by the delivery agent to monitor orders and to receive delivery routes from the delivery system. In this example, the delivery system periodically or continuously logs the location of the delivery agent computing device to determine delivery routes. In an example, the user authorized the delivery system to log the location of the user computing device. The delivery system periodically or continuously logs the location of the user computing device during the delivery time window and a predefined time range prior to the delivery time window. In an example, the delivery system determines the delivery route based on the current locations of the user computing device and delivery agent device. In an example, the delivery route may be displayed in a map format for the delivery agent to follow as the delivery agent drives a delivery vehicle comprising the user's order to the location of the user computing device.

The delivery agent approaches the user location. In an example embodiment, at a predefined time prior to an estimated delivery time, the delivery system transmits an alert to the user computing device with an estimated arrival time of the delivery and a request for the user not to move from the specific location. For example, the user receives an alert comprising an estimated arrival time of 15 minutes and the user is requested not to move more than 100 yards from the current location during this time so that the delivery agent is able to find the user to make the delivery. In an example embodiment, if the user changes location after receiving the alert comprising the estimated arrival time and request not to move from specific location, the delivery system determines a new delivery route for the delivery agent and transmits the new route to the delivery computing device. In this example, the new delivery route is based on the current locations of the user computing device and delivery agent computing device. The delivery agent approaches the new user location and the user receives a new alert on the user computing device from the delivery system comprising an estimated delivery time and a request not to move from the specific location. In another example embodiment, the user repetitively moves from the specific location after receiving two or more alerts. In this example embodiment, the delivery system may transmit a subsequent delivery route to the delivery agent computing device for the delivery agent to continue to attempt to make a delivery or may offer the user the option to reschedule the delivery, the option to accept delivery to a fixed address provided by the user, and/or the option to cancel the order.

In an example embodiment, the delivery agent arrives at the user location. The delivery system transmits an alert to the user computing device that the delivery agent has arrived at the user location. In an example, the user computing device displays the alert that the delivery agent has arrived at the user location. The user receives a package comprising the user's order from the delivery agent. In an example embodiment, if the delivery agent has difficulty finding the user the delivery agent may contact the user at a phone number provided by the user.

Example System Architecture

Turning now to the drawings, in which like numerals indicate like (but not necessarily identical) elements throughout the figures, example embodiments are described in detail.

FIG. 1 is a block diagram depicting a system 100 for dynamically adjusting a delivery location based on a location of a user computing device 110, in accordance with certain example embodiments. As depicted in FIG. 1, the system 100 includes network computing systems 110, 130, 140, and 150 that are configured to communicate with one another via one or more networks 120. In some embodiments, a user associated with a device must install an application and/or make a feature selection to obtain the benefits of the techniques described herein.

The network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, 140, and 150 includes a device having a communication module capable of transmitting and receiving data over the network 120. For example, each network computing device 110, 130, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, 140, and 150 are operated by users merchant system operators, delivery system operators, and delivery agents, respectively.

An example user computing device 110 comprises a data storage unit 112, a communication application 113, a web browser 114, a user interface 115, a shopping application 116, and a GPS module 118.

In an example embodiment, the data storage unit 112 comprises a local or remote data storage structure accessible to the user computing device 110 suitable for storing information. In an example embodiment, the data storage unit 112 stores encrypted information, such as HTML5 local storage.

In an example embodiment, the user 101 can use a communication application 113, such as a web browser 114 application or a stand-alone shopping application 116, to view, download, upload, or otherwise access documents or web pages via a distributed network 120.

In an example embodiment, the communication application 113 can interact with web servers or other computing devices connected to the network 120, including the user computing device 110, a web server 133 associated with a merchant system 130 and/or a web server (not depicted) associated with a delivery system 140.

In an example embodiment, the web browser 114 can authorize the user 101 to interact with web pages using the user computing device 110. In an example embodiment, the user 101 submits an order to the merchant system 130 via an application on the web browser 114. In another example embodiment, the user 101 enters a shipping address, selects an option for the order to be delivered to the location of the user computing device 110, and/or selects a delivery time window via the web browser 114.

In an example embodiment, the user interface 115 enables the user 101 to interact with the shopping application 116 and/or web browser 114. For example, the user interface 115 may be a touch screen, a voice-based interface or any other interface that allows the user 101 to provide input and receive output from an application or module on the user computing device 110. In an example embodiment, the user 101 interacts via the user interface 115 with the shopping application 116 and/or web browser 114 application to enter a shipping address, select an option for the order to be delivered to the location of the user computing device 110, and/or select a delivery time window. In another example embodiment, the user 101 interacts via the user interface 115 with the shopping application 116 and/or the web browser 114 application to provide alternative delivery instructions to the delivery system 140. For example, the user 101, via the user interface 115, selects an option to cancel the order and the delivery, selects an option to reschedule the delivery, or selects an option to accept delivery to a fixed shipping address.

In an example embodiment, the shopping application 116 is a program, function, routine, applet, or similar entity that exists on and performs its operations on the user computing device 110. In certain embodiments, the user 101 must install the shopping application 116 and/or make a feature selection on the user computing device 110 to obtain the benefits of the techniques described herein. In an example embodiment, the user 101 may access the shopping application 116 on the user computing device 110 via the user interface 115. In an example embodiment, the shopping application 116 may be associated with the merchant system 130. In another example embodiment, the application may be associated with the delivery system 140. In yet another example embodiment, there are two applications 116, one associated with the merchant system 130 and another associated with the delivery system 140. In an example embodiment, a shopping application 116 associated with the merchant system 130 communicates with the merchant system 130 from the user computing device 110. The shopping application 116 associated with the merchant system 130 may allow a user 101 to interact with the merchant system website 134 to place an order. The user 101 may interact with a shopping application 116 that communicates with the delivery system 140 to select a delivery time window, receive a map or other description of a delivery area associated with the delivery of the user's 101 order, and/or receive alerts from the delivery system 140 concerning the delivery of the user's 101 order.

In certain example embodiments, one or more functions herein described as performed by the shopping application 116 may also be performed by a web browser 114 application, for example, a web browser 114 application associated with a merchant system website 134 or associated with the delivery system 140. In certain example embodiments, one or more functions herein described as performed by the shopping application 116 may also be performed by the user computing device 110 operating system. In certain example embodiments, one or more functions herein described as performed via the web browser 114 may also be performed via the shopping application 116.

In an example embodiment, the GPS module 118 communicates with one or more satellites of the Global Positioning System ("GPS") or other satellite-based location system to determine the location of the user computing device 110. In an example embodiment, the user 101 gives the delivery system 140 permission to log the location of the user computing device 110 during a selected delivery time window and during a predefined time period prior to the delivery time window. In this example embodiment, the delivery system 140 periodically or continuously communicates with the GPS module 118 during applicable time periods to determine and log the location of the user computing device 110. In another embodiment, the location of the user computing device 110 is identified based on Wi-Fi signals, cellular location, or any suitable location identifying technology.

In an example embodiment, the user computing device 110 communicates with the merchant system 130 and the delivery system 140 via the network 120.

An example merchant system 130 comprises a data storage unit 132, a server 133, a website 134. In an example embodiment, the merchant system 130 communicates with a delivery system 140 over the network 120. In certain example embodiments described herein, the merchant system 130 is a separate entity from the delivery system 140. However, in certain other example embodiments, the merchant system 130 is associated with a delivery system 140, is a component of another system along with a delivery system 140, comprises a delivery system 140, or is a component of a delivery system 140.

In an example embodiment, the data storage unit 132 comprises a local or remote data storage structure accessible to the merchant system 130 suitable for storing information. In an example embodiment, the data storage unit 132 stores encrypted information, such as HTML5 local storage.

In an example embodiment, the web server 133 provides content accessible by the user 101 through the web browser 114 and/or shopping application 116 on the user computing device 110, including but not limited to html documents, images, style sheets, and scripts. In an example embodiment, the server 133 supports the merchant system's 130 website 134.

In an example embodiment, the website 134 comprises a shopping website that user 101 may access via the shopping application 116 and/or web browser 114 on the user computing device 110. In an example embodiment, the user 101 may select one or more products on the merchant system website 134 and submit an order. In an example embodiment, the user 101 may select an option for delivery to the location of the user computing device 110. In an example embodiment, the website 134 communicates with the delivery system 140 to offer shipping options to the user 101.

An example delivery system 140 comprises a delivery system computing device 141, an example delivery system computing device 141 comprising a data storage unit 142, a delivery logistics module 146, and a delivery location module 148. In an example embodiment the delivery system 140 communicates with a user computing device 110, a merchant system 130 and/or a delivery agent computing device 151 over the network 120.

In an example embodiment, a delivery agent (not shown) associated with the delivery system 140 uses the delivery system computing device 141 to facilitate a delivery to a user 101. In an example embodiment, the delivery agent receives a delivery route on the delivery agent computing device 151 from the delivery system 140 via the network 120. In this example embodiment, the delivery system 140 logs the location of the delivery agent computing device 151 and the location of the user computing device 110 during a delivery time window and during a predefined time period prior to the delivery time window.

In an example embodiment, the delivery route is based on the location of the delivery agent computing device 151 and the location of the user computing device 110. In this example embodiment, the delivery agent travels via received delivery route to the location of the user computing device 110. In an example embodiment, the delivery agent computing device 151 is a mobile handheld device. In another example embodiment, the delivery agent computing device 151 is built in to the delivery vehicle 150.

In an example embodiment, the delivery agent uses a delivery vehicle 150 to facilitate a delivery to the user 101. In an example embodiment, the delivery vehicle 150 is associated with the delivery system 140. In another example embodiment, the delivery vehicle 150 is the delivery agent's personal vehicle.

In an example embodiment, the data storage unit 142 comprises a local or remote data storage structure accessible to the delivery system computing device 141 suitable for storing information. In an example embodiment, the data storage unit 142 stores encrypted information, such as HTML5 local storage. In an example embodiment, the data storage unit 142 stores locations of the user computing device 110 and/or the delivery agent computing device 151 logged by the delivery system 140.

In an example embodiment, the delivery logistics module 146 is used by the delivery system computing device 141 to determine a delivery route for the delivery agent. In an example embodiment, the delivery logistics module 146 communicates with the data storage unit 142 and/or the delivery location module 148 to determine the current locations of the delivery agent computing device 151 and the user computing device 110. In an example embodiment, the delivery system computing device 141 determines the delivery route based on the locations of the user computing device 110 and the delivery agent computing device 151. In an example embodiment, the delivery logistics module 146 transmits the delivery route to the delivery agent computing device 151. In an example embodiment, the delivery logistics module 146 communicates with the delivery location module 148 and/or the data storage unit 142 to determine changes in the locations of the user computing device 110 and/or the delivery agent computing device 151. In an example embodiment, the delivery logistics module 146 may determine a new delivery route or edit an existing delivery route in response to determining that the location of the user computing device 110 and/or delivery agent computing device 151 has changed. In this example embodiment, the delivery logistics module 146 transmits the new delivery route or edited delivery route to the delivery agent computing device 151

In an example embodiment, the delivery location module 148 communicates with the user computing device and/or the delivery agent computing device 151 to determine the locations of the respective devices. In an example embodiment, the delivery location module 148 transmits a request over the network 120 to the user computing device 110 to continuously or periodically log the location of the user computing device 110 during a user-selected delivery time window and during a predefined time period prior to the delivery time window. In this example embodiment, the delivery location module 148 may receive an authorization from the user 101 to log the location of the user computing device 110 as a response to this request. If the delivery location module 148 receives the authorization to log the location of the user computing device 110, the delivery location module 148 continuously or periodically logs the location of the user computing device 110 during the delivery time window and during a predefined period prior to the delivery time window. In certain example embodiments described herein, logging the location of the user computing device 110 comprises transmitting a request to the user computing device 110 for the current location of the user computing device 110. In this example embodiment, the user computing device 110 communicates with the GPS module 118 resident on the user computing device 110 to determine the current location of the user computing device 110. In this example embodiment, the user computing device 110 communicates the current location of the user computing device 110 to the delivery system computing device 141 to complete the process for logging the location of the user computing device 110. In an example embodiment, one or more locations of the user computing device 110 determined by the delivery location module 148 is stored in the data storage unit 142.

In an example embodiment, the delivery location module 148 continuously or periodically logs the location of the delivery agent computing device 151 during time periods applicable to a delivery. In this example embodiment, a delivery agent may log into a delivery application 156 on the delivery agent computing device 151 that communicates with the delivery location module 148. In certain example embodiments described herein, logging the location of the delivery agent computing device 151 comprises transmitting a request to the delivery agent computing device 151 for the current location of the delivery agent computing device 151. In this example embodiment, the delivery agent computing device 151 communicates with the GPS module 158 resident on the delivery agent computing device 151 to determine the current location of the delivery agent computing device 151. In this example embodiment, the delivery agent computing device 151 communicates the current location of the delivery agent computing device 151 to the delivery system computing device 141 to complete the process for logging the location of the delivery agent computing device 151. In an example embodiment, one or more locations of the delivery agent computing device 151 determined by the delivery location module 148 is stored in the data storage unit 142.

An example delivery agent computing device 151 resides within a delivery vehicle and comprises a data storage unit 152, a communication application 153, a web browser 154, a user interface 155, a delivery application 156, and a GPS module 158. In an example embodiment, a delivery agent employed by, associated with, or acting in behalf of the delivery system 140 operates the delivery agent computing device 151. In certain example embodiments the delivery agent computing device 151 is a component of the delivery vehicle 150. In certain other example embodiments, the delivery agent computing device 151 is a portable device carried on the delivery agent's person and the delivery agent may or may not utilize the delivery vehicle 150. In an example embodiment, a delivery agent (not shown) associated with the delivery system 140 uses the delivery agent computing device 151 to facilitate deliveries. In an example embodiment, the delivery agent computing device 151 receives a delivery route and details of the user's 101 order. In this example embodiment, the delivery agent uses the delivery route and information concerning the user's 101 order to deliver the one or more products in the user's 101 order to the location of the user computing device 110.

In an example embodiment, the delivery agent uses the delivery vehicle 150 to make deliveries. In certain example embodiments, the delivery agent does not utilize a delivery vehicle 150 to make deliveries and utilizes other means of transportation such as a bicycle, a horse, walking, or any other appropriate or useful means of transportation to make deliveries.

In an example embodiment, the data storage unit 152 comprises a local or remote data storage structure accessible to the delivery agent computing device 151 suitable for storing information. In an example embodiment, the data storage unit 152 stores encrypted information, such as HTML5 local storage.

In an example embodiment, the delivery agent (not shown) can use a communication application 153, such as a web browser 154 application or a stand-alone delivery application 156, to view, download, upload, or otherwise access documents or web pages via a distributed network 120.

In an example embodiment, the communication application 153 can interact with web servers or other computing devices connected to the network 120, including the user computing device 110, a web server 133 associated with a merchant system 130 and/or a web server (not depicted) associated with a delivery system 140.

In an example embodiment, the web browser 154 can enable the delivery agent to interact with web pages using the delivery agent computing device 151. In an example embodiment, the delivery agent receives a delivery route via a web browser 154 application on the web browser 154 over the network 120. In another example embodiment, the delivery agent communicates a successful delivery over the network 120 to the delivery system 140 via the web browser 154.

In an example embodiment, the user interface 155 enables the delivery agent to interact with the delivery application 156 and/or web browser 154. For example, the user interface 155 may be a touch screen, a voice-based interface or any other interface that allows the delivery agent to provide input and receive output from an application or module on the delivery agent computing device 151. In an example embodiment, the delivery agent interacts via the user interface 155 with the delivery application 156 and/or web browser 154 application to confirm a successful delivery to the user 101 at the location of the user computing device 110.

In an example embodiment, the delivery application 156 is a program, function, routine, applet, or similar entity that exists on and performs its operations on the delivery agent computing device 151. In certain embodiments, the delivery agent or other operator associated with the delivery system 140 must install the delivery application 156 and/or make a feature selection on the delivery agent computing device 151 to obtain the benefits of the techniques described herein. In an example embodiment, the delivery agent may access the delivery application 156 on the user computing device 110 via the user interface 155. In an example embodiment, the delivery agent establishes an account with the delivery system 140. In this example embodiment, the delivery agent accesses the account via the delivery application 156. In an example embodiment, when a delivery agent accesses the account, the delivery system 140 is able to log the location of the delivery agent computing device 151. In an example embodiment, the delivery agent receives a delivery route via the delivery application 156 over the network 120. In another example embodiment, the delivery agent communicates a successful delivery to delivery system 140 via the web browser 154.

In an example embodiment, the GPS module 158 communicates with one or more satellites of the Global Positioning System or other satellite-based location system to determine the location of the delivery agent computing device 151. In an example embodiment, delivery system 140 logs the location of the delivery agent computing device 151 during a selected delivery time window and any other appropriate times before or after the selected delivery time window. In this example embodiment, the delivery system 140 periodically or continuously communicates with the GPS module 158 during applicable time periods to determine and log the location of the delivery agent computing device 151. In an example embodiment, based on the logged locations of the user computing device 110 and the delivery agent computing device 151, the delivery system 140 determines a delivery route for the delivery agent and transmits the delivery route to the delivery agent computing device 151.

It will be appreciated that the network connections shown are example and other means of establishing a communications link between the computers and devices can be used. Moreover, those having ordinary skill in the art having the benefit of the present disclosure will appreciate that the user computing device 110, the merchant system 130, the delivery system 140 and the delivery agent computing device 151 illustrated in FIG. 1 can have any of several other suitable computer system configurations. For example, a user computing device 110 embodied as a mobile phone or handheld computer may or may not include all the components described above.

Example Processes

The example methods illustrated in FIGS. 2-7 are described hereinafter with respect to the components of the example operating environment 100. The example methods of FIGS. 2-7 may also be performed with other systems and in other environments.

Figure 2:
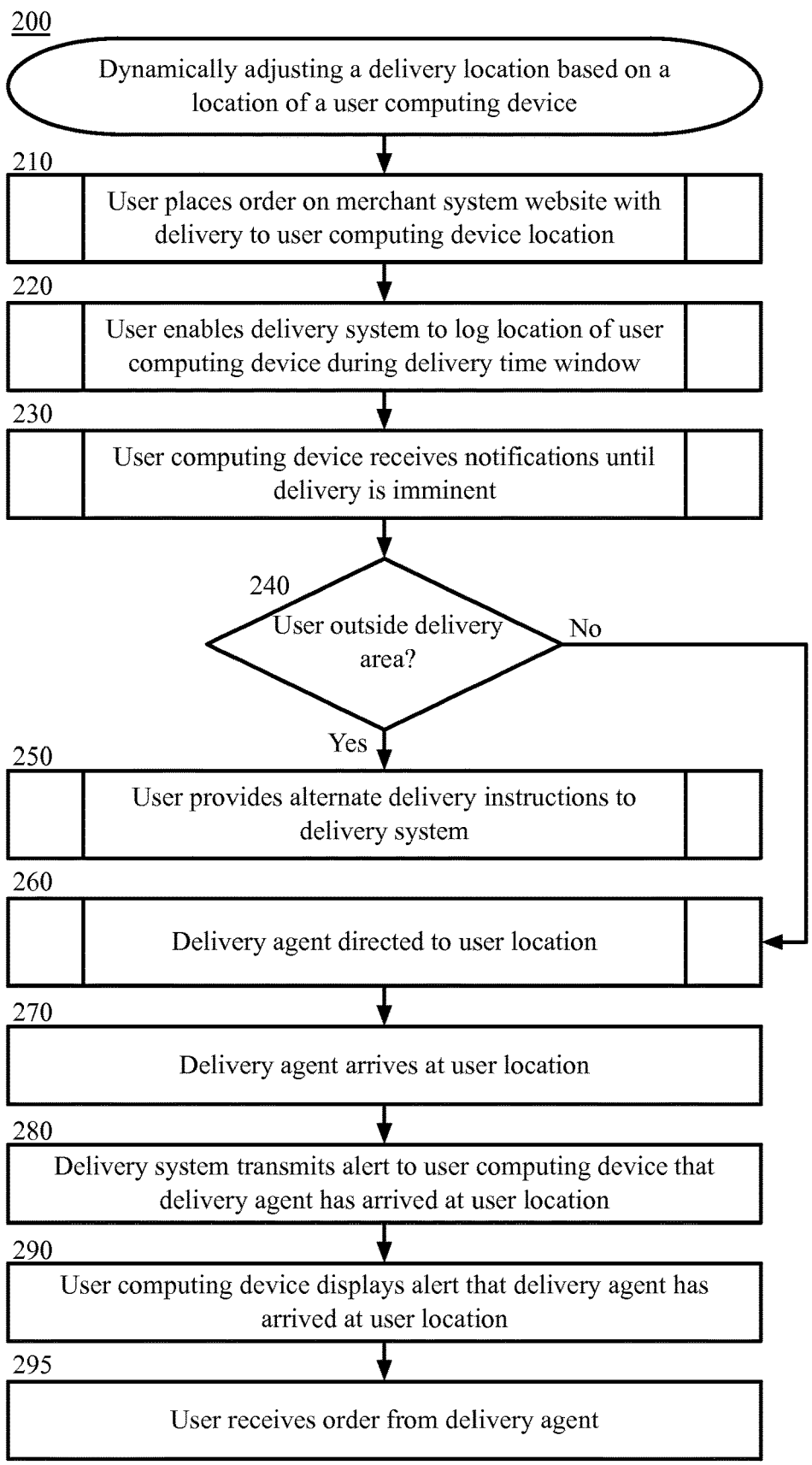
FIG. 2 is a block flow diagram depicting a method for dynamically adjusting a delivery location based on a location of a user computing device, in accordance with certain example embodiments.

FIG. 2 is a block diagram depicting a method 200 for dynamically adjusting a delivery location based on a location of a user computing device 110, in accordance with certain example embodiments. The method 200 is described with reference to the components illustrated in FIG. 1.

In block 210, the user 101 places an order on a merchant system website 134 with delivery to a location of a user computing device 110. The method for placing an order with a merchant system 130 and confirming delivery to a user location within a delivery area is described in more detail hereinafter with reference to the method described in FIG. 3.

Figure 3:
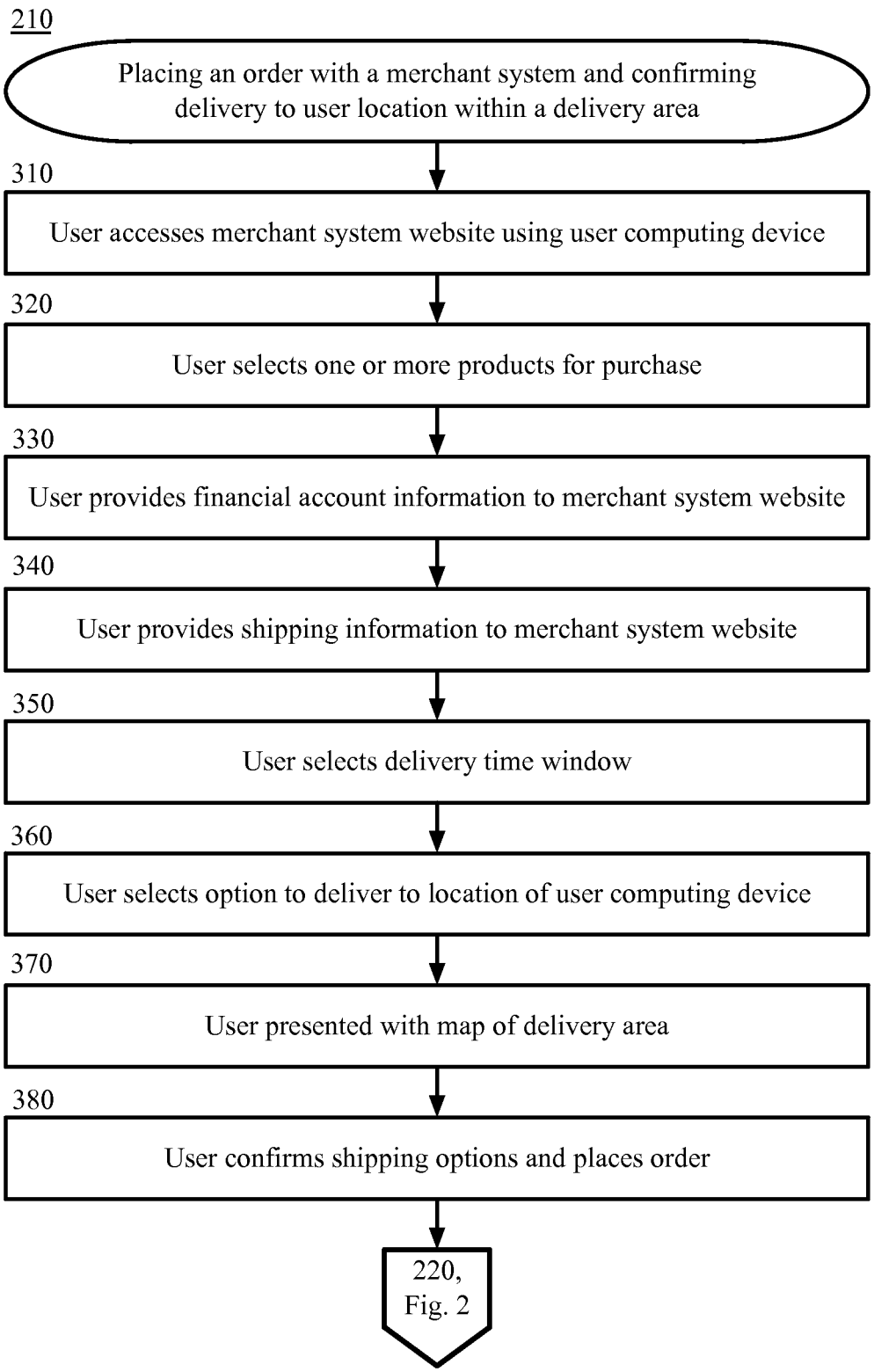
FIG. 3 is a block flow diagram depicting a method for placing an order with a merchant website and confirming a delivery to a user location within a delivery area, in accordance with certain example embodiments.

FIG. 3 is a block diagram depicting a method 210 for placing an order with a merchant system 130 and confirming delivery to a user location within a delivery area, in accordance with certain example embodiments. The method 210 is described with reference to the components illustrated in FIG. 1.

In block 310, the user 101 accesses the merchant system website 134 using the user computing device 110. For example, the user 101 intends to purchase one or more products from the merchant system website 154. In an example embodiment, the user 101 enters the merchant system website 134 address into the address bar of the user computing device 110 web browser 114. In another example embodiment, the user 101 accesses the merchant website via a shopping application 116 that communicates with the merchant website 134 over the network 120. For example, the shopping application 116 may be associated with the merchant system 130. In this example embodiment, the user 101 downloads the shopping application 116 on the user computing device 110.

In block 320, the user 101 selects one or more products for purchase. In an example embodiment, the user 101 selects one or more products on the website 134 to add to a virtual shopping cart on the website 134. For example, the user 101 selects an object on a user interface 115 that reads "add to cart" to add the product to the virtual shopping cart. In an example embodiment, the user 101 selects an option to checkout. In this example embodiment, the website 134 presents the user with an itemized list of items that are in the virtual checkout card with corresponding prices and a total price for the order. In an example embodiment, the user 101 selects an option to pay, wherein the website 134 asks the user 101 to provide financial account information to use in a financial transaction to purchase the one or more products selected by the user 101.

In block 330, the user 101 provides financial account information to the merchant system website 134. A financial account may comprise a bank account, a credit account, a stored-value account, or any other financial account. In an example embodiment, financial account information comprises information associated with the financial account necessary to enable a financial transaction to be processed using the financial account. For example, the user 101 provides the name associated with a credit card account, a credit card number associated with the credit card account, a billing address associated with the credit card account, the credit card security code, the credit card expiration date, and any other suitable information.

In block 340, the user 101 provides shipping information to the merchant system website 134. In an example embodiment, the user 101 provides to the website 134 a residential or business address where the user 101 prefers delivery of the one or more products. For example, the user 101 enters the address via the user interface 115 of the user computing device 115 by entering components of the address and/or selecting components of the address from a menu on the website 134.

In block 350, the user 101 selects a delivery time window. An example delivery time window may comprise a date and a range of time wherein the user 101 should expect delivery. For example, a user 101 selects a delivery time window of Friday, May 16, 2014 between 2:00 p.m. and 5:00 p.m. Eastern Daylight Time. In an example embodiment, the merchant system website 134 receives one or more delivery time windows available to the user 101 from the delivery system 140. In this example embodiment, the merchant system website 134 may communicate the order details and user's shipping information to the delivery system 140 so that the delivery system 140 may generate the one or more delivery time windows based on the order details and user's shipping information. For example, the order details may comprise a list of the one or more products ordered, the products' weights and dimensions, the availability of the products, and any other useful information relevant to the shipping or delivery of the one or more products. In another example embodiment, the merchant system website 134 comprises an application associated with the delivery system 140 wherein the user 101 may configure delivery options for an order. In another example, the delivery system 140 or the merchant system 130 determine the delivery window without an input for the user 101.

In block 360, the user 101 selects an option to deliver to the location of the user computing device 110. In an example embodiment, the user 101 may select an object on the user interface 115 on the website 134, such as a checkbox, to enable the option to deliver to the location of the user computing device 110. For example, the user 101 may select a checkbox that reads "deliver to me at my exact location" and/or a description that communicates to the user 101 that the delivery will be to the location of the user computing device 110 if the option is selected.

In block 370, the user 101 is presented with a map of a delivery area. An example delivery area comprises a bounded physical area based on the physical address provided by the user 101 or a maximum distance from the physical address in which the user 101 and the user computing device 110 should be present during the delivery time window so that delivery may be effected. For example, the delivery area may comprise any physical point within a circular area with a radius that is less than or equal to a predefined distance from a fixed physical point. In this example, the delivery area may be a circular area with a radius of 5 miles from a fixed physical point. In this example, the fixed physical point may comprise the shipping address provided by the user. For example, if the user 101 leaves the delivery area during the delivery time window or is not present within the delivery area at the start of the delivery time window, the delivery system may decline to deliver an order of a user 101 and may give the user 101 the option to reschedule the delivery, cancel the order, or accept delivery to the physical address provided by the user 101. An example delivery area may be presented to the user 101 in a map format, a numerical maximum distance (for example, in miles or kilometers) from the physical address wherein the user 101 may receive delivery, or any other appropriate format. In an example embodiment, the merchant system website 134 receives the delivery area from the delivery system 140 and presents the delivery area to the user on the merchant system website 134. In this example embodiment, the delivery system 140 determines the delivery area. The delivery system 140 may determine the delivery area based on the shipping address provided by the user, based on the current location of the user computing device 110 at the time of the order, or based on some other appropriate location data.

In block 380, the user 101 confirms shipping options and places an order. In an example embodiment, the user 101 actuates an object on a user interface 115 to confirm the shipping option to deliver to the location of the user computing device 110 within the delivery area and to place the order. In an example embodiment, the merchant system website 134 communicates shipping information and order details to the delivery system 140.

From block 380, the method 210 proceeds to block 220 of FIG. 2.

Returning to FIG. 2, in block 220, the user 101 authorizes a delivery system 140 to log the location of the user computing device 110 during the delivery time window. The method for enabling the delivery system 140 to log the location of a user computing device 110 is described in more detail hereinafter with reference to the method described in FIG. 4.

Figure 4:
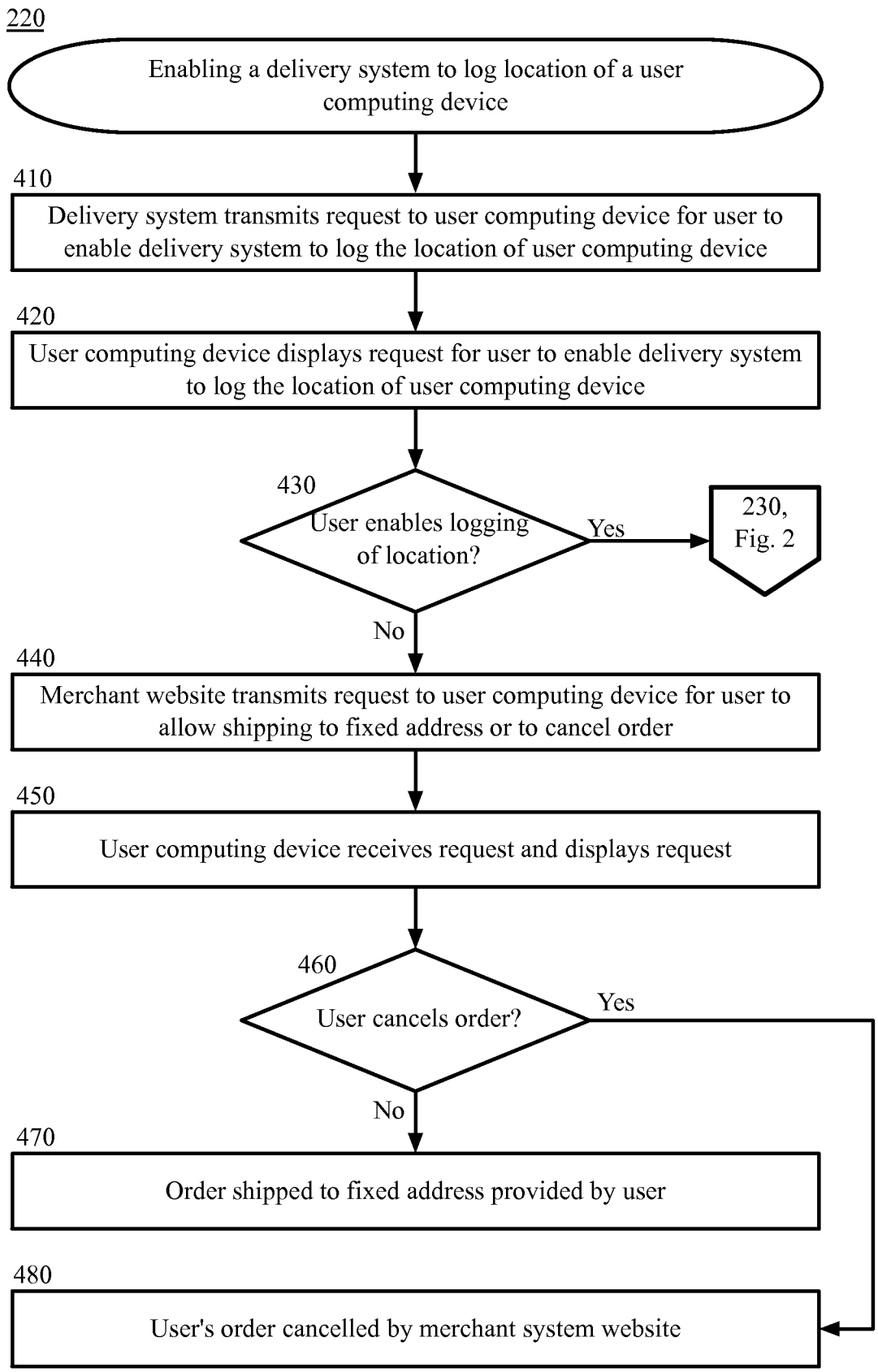
FIG. 4 is a block flow diagram depicting a method for enabling a delivery system to log the location of a user computing device, in accordance with certain example embodiments.

FIG. 4 is a block diagram depicting a method 220 for enabling a delivery system 140 to log the location of a user computing device 110, in accordance with certain example embodiments. The method 220 is described with reference to the components illustrated in FIG. 1.

In block 410, the delivery system 140 transmits a request to the user computing device 110 for the user 101 to authorize the delivery system 140 to log the location of the user computing device 110. In an example embodiment, the request is transmitted via the merchant system website 134.

In block 420, the user computing device 110 displays the request for the user 101 to authorize the delivery system 140 to log the location of the user computing device 110. The request to authorize the delivery system 140 to log the location of the user computing device 110 comprises a request to log the location of the user computing device 110 during the delivery time window and during a predefined period before the delivery time window begins. For example, to log the current location of the user computing device 110, the delivery system 140 transmits a request over the network 120 to the user computing device 110 for its current location and the global positioning system ("GPS") module 118 of the user computing device 110 communicates the current location of the user computing device 110 to the delivery system 140 over the network 120 via the application 116 or the communication application 113. In an example, the current location comprises the longitude and latitude of the user computing device 110 as determined by the GPS module 118 from communicating with one or more satellites in the global positioning system or other satellite-based positioning system. In another example, the user computing device 110 determines its current location by communicating with one or more cell towers or Wi-Fi providers. In example embodiments described herein, the delivery system 140 provides a request to periodically or continuously log the location of the user computing device 110 during the predefined period before the delivery time window begins and during the delivery time window. As previously discussed, the delivery time window is selected by the user 101 during checkout. In another example embodiment, the merchant system 130 or delivery system 140 selects the delivery time window. In an example, the predefined period before the delivery time window begins comprises enough time for a user 101 to enter the delivery area if the user 101 is outside of the delivery area at the beginning of the predefined period. For example, the predefined period may begin one hour or two hours before the delivery time window begins. In an example embodiment, the merchant system website 134 received the request to authorize the delivery system 140 to log the location of the user computing device 110 from the delivery system 140 and displays the request to the user 101 on the user computing device 110. In an example embodiment, the user computing device 110 web browser 114 is redirected to a delivery system 140 website, wherein the user computing device 110 displays the request.

In block 430, the user 101 authorizes or does not authorize the location of the user computing device 110 to be logged by the delivery system 140. In an example embodiment, the delivery system 140 presents the user 101 with one or more objects on the user interface 115 to respond to the request. For example, the user 101 may be presented with an option that displays "authorize my location to be logged for the purposes of delivery" and another option that displays "no, do not log my location." In this example embodiment, the user 101 actuates one or more objects on the user interface 115 to indicate to the delivery system 140 whether the user grants permission to the delivery system 140 to log the user 101 location during the delivery time window and during the predefined period prior to the delivery time window. In an example embodiment, the delivery system 140 may advise the user 101 that selecting not to authorize the delivery system 140 to log the location of the user computing device 110 would make delivery to the user computing device 110 location impossible and that other delivery arrangements would be required.

If the user does not authorize the location of the user computing device 110 to be logged by the delivery system 140, the method 220 proceeds to block 440. For example, the user 101 actuates an object on the user interface 115 that indicates to the delivery system 140 that the user 101 does not wish to authorize the delivery system 140 to log the location of the user computing device 110.

In block 440, the merchant system website 134 transmits a request to the user computing device 110 for the user 101 to allow shipping to a fixed address or to cancel the order. In an example embodiment, the delivery system 140 communicates to the merchant system 130 a notice that the user 101 selected not to authorize the delivery system 140 to log the location of the user computing device 110. In this example embodiment, merchant system 134 transmits the request to allow shipping to a fixed address or to cancel the order to the user computing device 110 in response to the merchant system 130 receiving this notice. In another example embodiment, the delivery system 140 transmits the request to the user computing device 110 for the user 101 to allow shipping to a fixed address or to cancel the order.

In block 450, the user computing device 110 receives the request and displays the request. In an example embodiment, the request may comprise a message and one or more objects on the user interface 115 that the user 101 may actuate to respond to the request. For example, the user 101 may be presented with an object on the user interface 115 that displays "cancel my order" and another object on the user interface 115 that displays "ship to a fixed address."

In block 460, the user 101 selects an option to cancel the order or selects an option to ship to a fixed address provided by the user by actuating the appropriate object on the user interface 115.

If the user selects an option to ship to a fixed address provided by the user, the method 220 proceeds to block 470. For example, the user 101 selects an object on the user interface 115 to ship to a fixed address and the merchant system website 134 and/or delivery system 140 receives a notification of a user 101 selection to ship to a fixed address.

In block 470, the order is shipped to the fixed address provided by the user 101. In an example embodiment, the delivery system 140 or merchant system website 134 transmits to the user 101 a request for a fixed address to which to ship the user's 101 order. In this example embodiment, the delivery system 140 transmits a request to the user computing device 110 for a new fixed address and the user 101 enters a fixed shipping address via the user computing device 110, which transmits the address to the delivery system 140 via the merchant system website 134. In another example embodiment, the delivery system 140 ships the order to the residential or business address provided by the user 101 to the merchant system website 134 in the shipping information during the checkout process. For example, this fixed address is the address that was used by the delivery system 140 to determine the delivery area.

Returning to block 460, if the user 101 selects an option to cancel the order, the method 220 proceeds to block 480. For example, the user 101 selects an object on the user interface 115 to cancel the order and the merchant system website 134 and/or delivery system 140 receives a notification of a user 101 selection to cancel the order.

In block 480, the user's order is cancelled by the merchant system website 134. In an example embodiment, the merchant system website 134 may process a transaction to refund the user 101 for all or part of the amount paid by the user 101 for the order. In an example embodiment, the merchant system website 134 notifies the delivery system 140 that the user's order has been cancelled and the delivery system 140 cancels any planned delivery. In an example embodiment, the user 101 receives a notification on the user computing device 110 that the user's 101 order has been cancelled. In an example embodiment, cancelling the order may comprise providing, by the merchant system 130, a refund to a user 101 financial account for all or part of the cost of the one or more items in the order. In another example embodiment, the order has not yet been processed by the merchant system 130.

Returning to block 430, if the user 101 authorizes the location of the user computing device 110 to be logged by the delivery system 140, the method 220 proceeds to block 230, in FIG. 2.

Returning to FIG. 2, in block 230, the user computing device 110 receives notifications to remain in a delivery area. The method for notifying a user 101 to remain in a delivery area is described in more detail hereinafter with reference to the method described in FIG. 5.

Figure 5:
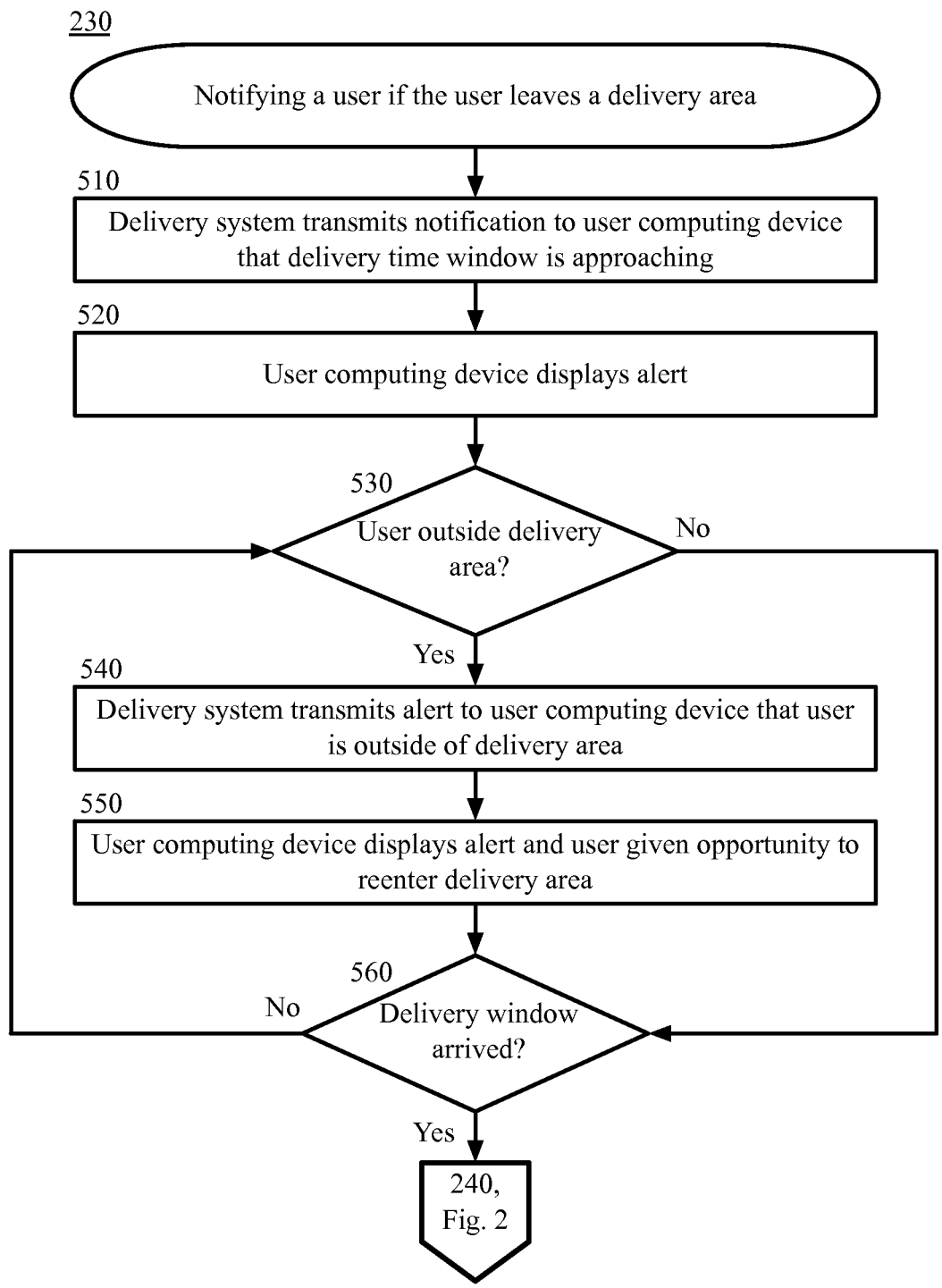
FIG. 5 is a block flow diagram depicting a method for notifying a user if the user leaves a delivery area, in accordance with certain example embodiments.

FIG. 5 is a block diagram depicting a method 230 for notifying a user 101 to remain in a delivery area, in accordance with certain example embodiments. The method 230 is described with reference to the components illustrated in FIG. 1.

In block 510, the delivery system 140 transmits a notification to the user computing device 110 that the delivery time window is approaching. In an example embodiment, the notification is transmitted at the beginning of the predetermined time period prior to the delivery time window or at any other appropriate time. In an example embodiment, this notification is transmitted to the shopping application 116 via the network 120. In another example embodiment, the user 101 receives a text message, email, or other appropriate communication medium comprising the notification on the user computing device 110

In block 520, the user computing device 110 displays the alert. For example the alert may display a message that displays "you may expect your delivery soon; please remain in the delivery area shown below to receive your delivery," along with a map of the delivery area. In another example, the alert may display a message that displays "you may expect your delivery soon; please remain within a two mile distance of the following address to receive your delivery," along with the address that was provided by the user 101 during the checkout process and used by the delivery system 140 to determine the delivery area. Any other suitable display may be presented to the user 101.

In block 530, the user 101 may leave or remain inside the delivery area. In an example embodiment, in accordance with a user 101 enabling the delivery system 140 to log the location of the user computing device 110 during a preconfigured time prior to the delivery time window, the delivery system 140 periodically or continuously logs the location of the user computing device 110 to determine whether the user 101 has remained within or has left the delivery area. As previously discussed, to log the current location of the user computing device 110, the delivery system 140 may transmit a request over the network 120 to the user computing device 110 for its current location and the GPS module 118 on the user computing device 110 determines the current location of the user computing device 110 for communication to the delivery system 140 over the network 120. In an example, the current location comprises the longitude and latitude of the user computing device 110 as determined by the GPS module 118 from communicating with one or more satellites in the global positioning system or other satellite-based positioning system. In another example, the user computing device 110 determines its current location by communicating with one or more cell towers.

If the user leaves the delivery area, the method 230 proceeds to block 540. In an example embodiment, the delivery system 140 logs the location of the user computing device 110 at a time during the predetermined time prior to the beginning of the delivery time window. In this example embodiment, the delivery system 140 determines that the user computing device 110 location is outside of the delivery area. In an example embodiment, the delivery system 140 plots the current location of the user computing device 110 to a virtual map of the delivery area generated by the delivery system 140. In this example embodiment, if the current location of the user computing device 140 is outside of the virtual map delivery area, the user computing device 110 location is outside the delivery area. In another example embodiment, the delivery area is less than or equal to a predefined maximum distance from a delivery location. In this example embodiment, the delivery system 140 determines the distance between the location of the user computing device 110 and the delivery location. In this example embodiment, the delivery system 140 determines that the user computing device 110 is outside of the delivery area if the distance between the locations exceeds the predefined maximum distance.

In block 540, the delivery system 140 transmits an alert to the user computing device 110 that the user 101 is outside of the delivery area. In an example embodiment the delivery system 140 transmits the alert to the shopping application 116 over the network 120 and/or transmits this alert via text message, email, or other appropriate communication medium to the user computing device 110.

In block 550, the user computing device 110 displays the alert and the user 101 is given the opportunity to reenter the delivery area. In an example embodiment, the alert comprises a message that notifies the user 101 that the user is outside of the delivery area, and the user 101 must enter the delivery area within a certain time to receive the delivery. For example, an alert may display "to receive delivery of your order, you must enter the delivery area shown below" and display a map of the delivery area to the user 101 on the user interface 115 of the user computing device 110. In another example embodiment, the alert comprises a message that notifies the user 101 that the user 101 has until the beginning of the delivery time window to reenter the delivery area to authorize delivery of the user's 101 order.

The method 230 then proceeds to block 560.

Returning to block 530, if the user 101 does not leave the delivery area, the method 230 proceeds to block 560.

In block 560, the delivery system 140 determines if the delivery time window has arrived. In an example embodiment, during the predetermined time period before the delivery time window begins, during which the delivery system 140 periodically or continuously logs the location of the user computing device 110, the delivery system 140 periodically determines whether the user 101 is outside of the delivery area.

If the delivery time window has not arrived, the method 230 proceeds to block 530. In one example, the user 101 continues to receive alerts if the user 101 is outside of the delivery area and does not reenter the delivery area, or enters the delivery area and then leaves the delivery area again. In another example, the user 101 is within the delivery area and remains within the delivery area until the delivery time window commences. In yet another example, the user 101 leaves the delivery area one or more times and receives one or more alerts from the delivery system 140 advising the user 101 to reenter the delivery area before the arrival of the delivery time window to insure delivery of the user's 101 order.

If the delivery time window has arrived, the method 230 proceeds to block 240 in FIG. 2.

Returning to FIG. 2, in block 240, the delivery system 140 determines if the user 101 is outside of the delivery area. For example, when the delivery time window begins, the delivery system 140 logs the location of the user computing device 110 and determines if the location of the user computing device 110 is within the delivery area. In an example embodiment, the delivery system 140 plots the current location of the user computing device 110 to a virtual map of the delivery area generated by the delivery system 140. In this example embodiment, if the current location of the user computing device 140 is within the virtual map delivery area, the delivery system 140 determines that the user computing device 110 location is within the delivery area. In another example embodiment, the delivery area is less than or equal to a predefined maximum distance from a delivery location. In this example embodiment, the delivery system 140 determines the distance between the location of the user computing device 110 and the delivery location. In this example embodiment, the delivery system 140 determines that the user computing device 110 is within the delivery area if the distance between the locations is less than or equal to the predefined maximum distance. The predefined distance can be configured to account for location determination margin of error, for a desired accuracy, or for an amount of distance that is considered.

If the user 101 is outside of the delivery area, the method 200 proceeds to block 250. In the example embodiments described herein, if the user computing device 110 is outside of the delivery area when the delivery time window begins, the user 101 provides alternative delivery instructions to the delivery system 140. However, in certain other example embodiments, the delivery system 140 may send the user computing device 110 one or more additional alerts advising the user 101 to enter or reenter the delivery area after the beginning of the delivery time window. For example, the user 101 may be given until a threshold time after the beginning of the delivery time window and before an estimated delivery time to enter or reenter the delivery area.

In block 250, the user 101 provides alternative delivery instructions to the delivery system 140. The method for providing alternative instructions for delivery to a delivery system 140 is described in more detail hereinafter with reference to the method described in FIG. 6.

Figure 6:
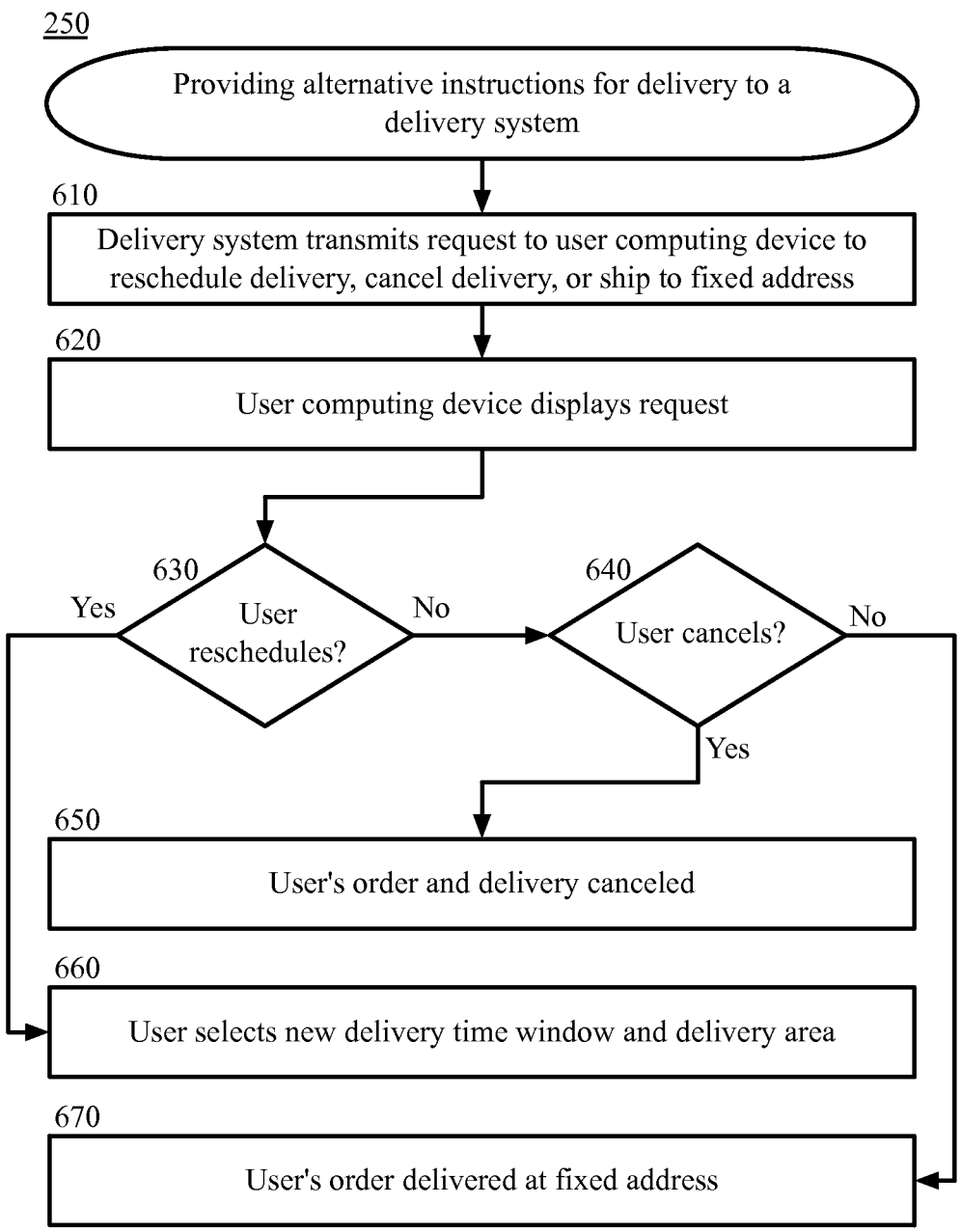
FIG. 6 is a block flow diagram depicting a method for providing alternative instructions for delivery to a delivery system, in accordance with certain example embodiments.

FIG. 6 is a block diagram depicting a method 250 for providing alternative instructions for delivery to a delivery system 140, in accordance with certain example embodiments. The method 250 is described with reference to the components illustrated in FIG. 1.

In block 610, the delivery system 140 transmits a request to the user computing device 110 to reschedule delivery, cancel the order and delivery, or ship to a fixed address. In the example embodiments described herein, the user 101 is presented with three options: an option to reschedule the delivery, an option to cancel the order and the delivery, and an option to ship to a fixed address. In another example embodiment, the request may comprise one, two, all, or none of the three aforementioned options and may further comprise other appropriate options to take the place of the current delivery to the location of the user computing device 110. For example, an additional appropriate option may comprise an option for the user 101 to pick up the order at a store location associated with the merchant system 130.

In block 620, the user computing device 110 displays the request. In an example embodiment, the display of the request may comprise one or more objects on the user interface 115 that the user 101 may select on the user computing device 110 to select one of the available options provided by the delivery system 140.

In block 630, the user 101 may select an option to reschedule the delivery to the user computing device 110 location. For example, the user 101 actuates an object on the user interface 115 to select the option to reschedule the delivery to the user computing device 110 location. In this example, when the user 101 actuates the object on the user interface 115 to select the option, the user computing device 110 transmits a notification of the user 101 selection of the option to the delivery system 140 and/or the merchant system website 134.

If the user 101 selects the option to reschedule the delivery to the user computing device 110 location, the method 250 proceeds to block 660.

In block 660, the user 101 selects a new delivery time window and a delivery area. In this example embodiment, the delivery system 140, in response to receiving a notification of a user 101 selection of an option to reschedule the delivery, may transmit one or more new delivery time windows to the user computing device 110. In this example embodiment, the user 101 may select a convenient delivery time window for an attempted second delivery. In this example embodiment, the user 101 may provide a new shipping address that is used by the delivery system 140 to calculate a new delivery area associated with the rescheduled delivery. In another example embodiment, the user 101 communicates with the merchant system website 134 via the user computing device 110 to reschedule the delivery. In this example embodiment, the merchant system website 134 communicates with the delivery system 140 to receive one or more new delivery time windows and presents the one or more delivery time windows to the user 101 for selection. In this example embodiment, in response to receiving a user 101 selection of a new delivery time window, the merchant system website 134 communicates the user 101 selection of the delivery time window to the delivery system 140. In an example embodiment, the user 101 requests a new delivery area based on a new address and provides a new shipping address to be used by the delivery system 140 to calculate a new delivery area. In this example embodiment, the user 101 may enter the new shipping address on the merchant system website 134 via the user computing device 110 and the merchant system website 134 may transmit the new shipping address to the delivery system 140. The delivery system 140 calculates a new delivery area based on the new shipping address provided by the user 101. In this example embodiment, the merchant system website 134 receives from the delivery system 140 data comprising the new delivery area and transmits the new delivery area to the user computing device 110. In another example embodiment, the delivery system 140 determines a delivery area in response to a user 101 providing a new shipping address directly to the delivery system 140 and the delivery system 140 transmits data comprising the delivery area to the user computing device 110.

Returning to block 630, if the user does not select the option to reschedule the delivery to the user computing device 110 location, the method 250 proceeds to block 640.

In block 640, the user 101 may select an option to cancel the order.

If the user 101 selects the option to cancel the order and delivery, the method 250 proceeds to block 650. For example, the user 101 actuates an object on the user interface 115 to select the option to cancel the order and the delivery. In this example, when the user 101 actuates the an object on the user interface 115 to select the option, the user computing device 110 transmits a notification of the user 101 selection of the option to the delivery system 140 and/or the merchant system website 134.

In block 650, the user's 101 order and delivery are cancelled. In an example embodiment, cancelling the order may comprise providing, by the merchant system 130, a refund to a user 101 financial account for all or part of the cost of the one or more items in the order. In another example embodiment, the order has not yet been processed by the merchant system 130. In an example embodiment, the user 101 receives a receipt from the merchant system 130 that the user's order has been cancelled. For example, the receipt may comprise a notification that the order has been cancelled and may provide details concerning a refund to the user 101 for all or part of the order purchase amount. In an example embodiment, the user 101 receives a receipt from the delivery system 140 and/or the merchant system 130 on the user computing device 110 that the delivery to the user computing device 110 location during the selected delivery time window has been cancelled.

Returning to block 640, if the user 101 does not select the option to cancel the order and the delivery, the method 250 proceeds to block 670.

In block 670, the order of the user 101 is delivered at a fixed address. In this example embodiment, the user 101 selects an option to deliver the user's 101 order to a fixed address. For example, the fixed address may be the residential or business address provided by the user 101 during the checkout process when the user 101 made the order. In another example, the user 101, upon receiving a request from the delivery system 140 or merchant website 134 on the user computing device 110, provides a new residential or business address to the delivery system 140 and/or merchant website 134 via the user computing device 110. In this example embodiment, the user's 101 order is delivered to this new address. In another example embodiment, the delivery system 140 may, as a matter of course, deliver the user's 101 order to the shipping address previously provided by the user 101 during the checkout process if the user 101 fails to select an option within a certain amount of time after receiving the request to reschedule delivery, cancel the order and delivery, or ship to a fixed address.

Returning to FIG. 2, in block 240, if the user 101 is not outside the delivery area, the method 200 proceeds to block 260.

In block 260, the delivery agent is directed to a location of the user computing device 110. The method for directing a delivery agent to the location of the user computing device 110 is described in more detail hereinafter with reference to the method described in FIG. 7.

Figure 7:
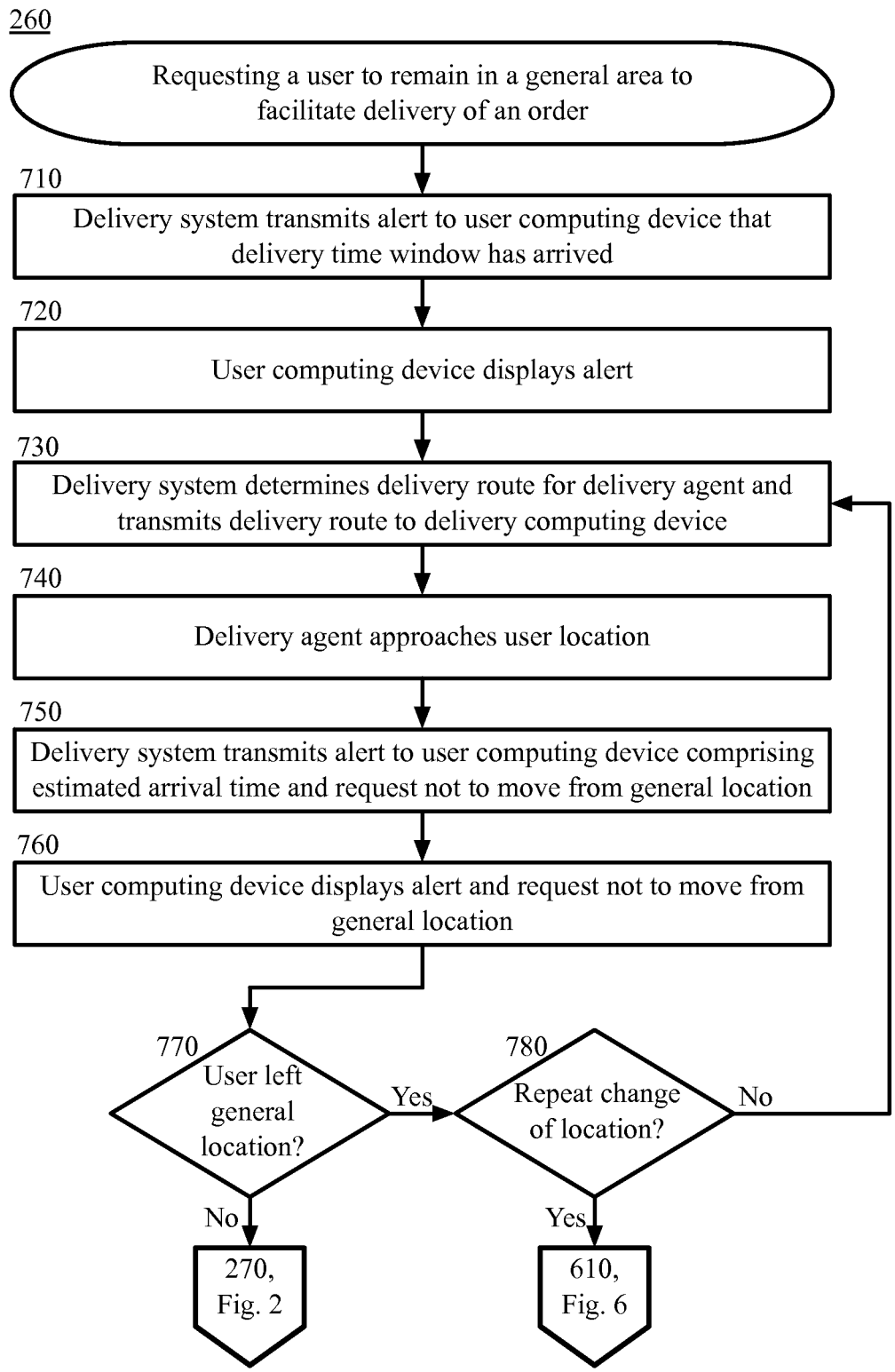
FIG. 7 is a block flow diagram depicting a method for requesting a user to remain in a general area to facilitate delivery of an order, in accordance with certain example embodiments.

FIG. 7 is a block diagram depicting a method 260 to direct a delivery agent to the location of the user computing device 110, in accordance with certain example embodiments. The method 260 is described with reference to the components illustrated in FIG. 1.

In block 710, the delivery system 140 transmits an alert to a user computing device 110 that the delivery time window has arrived.

In block 720, the user computing device 110 displays the alert. For example, a message is displayed on the user interface 115 that reads, "the delivery time window for your order has arrived! Please remain within the delivery area described below until your delivery is received," and displays a map of the delivery area that reminds the user 101 of the boundaries of the delivery area. In this example, the display of the alert may further comprise displaying the current location of the user computing device 110, as logged by the delivery system 140, on the map of the delivery area. As previously discussed, in certain example embodiments, in accordance with the user 101 enabling the delivery system 140 to log the location of the user computing device 110, the delivery system 140 continuously or periodically logs the location of the user computing device 110 to determine the delivery route for the delivery agent.

In block 730, the delivery system 140 determines a delivery route for a delivery agent and transmits the delivery route to the delivery agent computing device 151. In certain example embodiments described herein, the delivery system 140 continuously or periodically logs the location of the delivery agent computing device 151 to determine the delivery route. For example, to log the current location of the delivery agent computing device 151, the delivery system 140 transmits a request over the network 120 to the delivery agent computing device 151 for its current location and delivery agent computing device 151 GPS module 158 communicates the current location of the delivery agent computing device 151 to the delivery system 140 over the network 120. In an example, the current location comprises the longitude and latitude of the delivery agent computing device 151 as determined by the GPS module 158 from communicating with one or more satellites in the global positioning system or other satellite-based positioning system. In another example, the delivery agent computing device 151 determines its current location by communicating with one or more cell towers. In another embodiment, the location of the user computing device 110 is identified based on Wi-Fi signals, cellular location, or any suitable location identifying technology. In other example embodiments, the delivery system 140 does not determine a delivery route for the delivery agent. In these example embodiments, the delivery system 140 transmits a logged location of the user computing device 110 to the delivery agent computing device 151 and the delivery agent determines a route to the location or procures and/or receives a delivery route from another entity. For example, the delivery agent manually determines a delivery route by entering the location into a GPS-based navigation device.

As previously discussed, in accordance with the user 101 enabling the delivery system 140 to log the location of the user computing device 110, in certain example embodiments the delivery system 140 continuously or periodically logs the location of the user computing device 110 to determine the delivery route for the delivery agent.

In block 740, the delivery agent approaches a user 101 location. In an example embodiment, the delivery system 140 updates the delivery route as needed. For example, the delivery agent approaches the user 101 in the delivery vehicle 150 and makes a wrong turn along the delivery route. In this example, the delivery system 151 logs the current locations of the delivery agent computing device 151 and the user computing device 110, determines a new delivery route for the delivery agent, and transmits the new delivery route to the delivery agent computing device 151. Likewise, in another example, the user 101 may change position within the delivery area, which also may require the delivery system 140 to provide a new delivery route to the delivery agent via the delivery agent computing device 151.

In block 750, the delivery system 140 transmits an alert to the user computing device 110 comprising an estimated arrival time and request for the user 101 to remain in a specific location. In an example embodiment, the specific location is an area in which the user 101 can move with the user computing device 110 and the delivery system 140 does not need to re-determine a delivery route to direct the delivery agent to the user computing device 110 location. In an example embodiment, the specific location is smaller than the delivery area.

In block 760, the user computing device 110 displays the alert and request for the user 101 not to move from the specific location. In an example, a message is displayed on the user interface 115 of the user computing device 110 that reads, "Your delivery will arrive at your current location in approximately ten minutes! Please remain within 25 yards (23 meters) of your current location until your delivery arrives." In this example, the display of the alert may further comprise displaying the current location of the user computing device 110, as logged by the delivery system 140, on the map of the delivery area.

In block 770, the delivery system 140 determines if the user 101 has left the specific location before the delivery arrives. For example, the delivery system 140 logs the location of the user computing device 110 and the delivery agent computing device 151 and determines if a new delivery route is necessary for the delivery agent to reach the location of the user computing device 110. In this example, a new delivery route is necessary if the user 101 leaves the specific location and is not necessary if the user 101 remains within the general area.

If the user 101 leaves the specific location before the delivery arrives, the method 260 proceeds to block 780. In an example embodiment, the delivery system 140 determines a new delivery route based on the locations of the user computing device 110 and the delivery agent computing device 151 and transmits the new delivery route to the delivery agent computing device 151. In this example embodiment, the delivery agent adjusts course as needed as he approaches the user computing device 110 location.

In block 780, the delivery system 140 determines if the user 101 has repetitively left one or more specific locations and required the delivery system 140 to determine a new or subsequent delivery route one or more times.

If the user has left specific locations more than a configured number of times, the method 260 proceeds to block 610 in FIG. 6. For example, the user 101 leaves a specific location after receiving an alert to remain in the general area and the delivery system 140 determines a new delivery route and transmits the new delivery route to the delivery agent computing device 151. In this example, the user 101 receives a second alert to remain in a second general area but leaves the second general area. In this example, the delivery system 140 may decide not to complete the delivery and may decide to provide the user 101 with an opportunity to cancel the delivery and the order, reschedule the delivery, or accept delivery at a fixed address.

Returning to block 780, if the user 101 has not repetitively left specific locations, the method 260 proceeds to block 730. As described herein, in an example embodiment, the delivery system 140 determines a delivery route for a delivery agent and transmits the delivery route to the delivery agent computing device 151.

Returning to block 770, if the user 101 does not leave the specific location before the delivery arrives, the method 260 proceeds to block 270 in FIG. 2. In another example embodiment, if the user 101 does not leave a subsequent specific location before the delivery arrives, the method 260 also proceeds to block 270 in FIG. 2. In this example embodiment, a subsequent specific location is a specific location based on a subsequent delivery route determined by the delivery system 140 in response to a user 101 leaving a previous specific location.

Returning to FIG. 2, in block 270, the delivery agent arrives at the user 101 location. For example, the delivery agent follows the delivery route received on the delivery agent computing device 151 from the delivery system 140 until the delivery agent arrives at the user computing device 110 location. In an example embodiment, when the delivery agent arrives at the user computing device 110 location, the delivery agent computing device 151 transmits an alert to the delivery system 140 that the delivery agent has arrived at the user computing device 110 location.

In block 280, the delivery system 140 transmits an alert to the user computing device 110 that the delivery agent has arrived at the user 101 location. In an example embodiment, the alert advises the user 101 to remain in the user's 101 current location with the user computing device 110 until the delivery agent delivers the user's 101 order. In another example embodiment, the alert advises 101 the user 101 to receive the order at an appropriate nearby location. For example, the user 101 is inside of an office building and the alert requests the user 101 to proceed to the front of the building to receive the delivery from the delivery agent.

In block 290, the user computing device 110 displays the alert that the delivery agent has arrived at the user 101 location. For example, the alert comprises a message that reads, "your delivery has arrived! Please remain in your location and a delivery agent will give you your package shortly." In another example, the alert comprises a message that reads, "your delivery has arrived! Please pick up your delivery at the front of the building where a delivery agent will be waiting."

In block 295, the user 101 receives the order from the delivery agent. In an example embodiment, the user 101 signs a confirmation screen on the delivery agent computing device 151 to confirm delivery of the order and the delivery agent presents the user 101 with the delivery.

Other Example Embodiments

Figure 8:
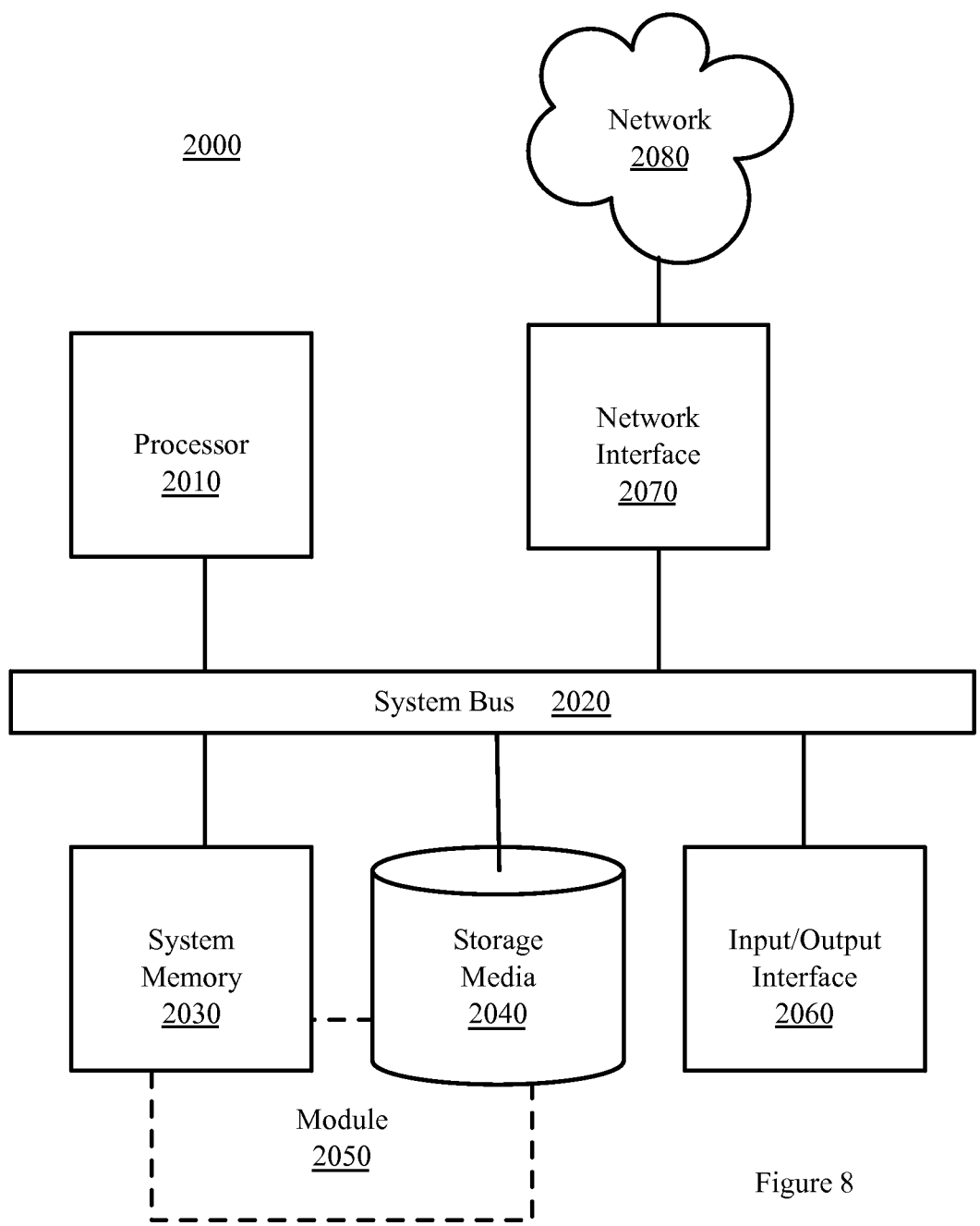
FIG. 8 is a block diagram depicting a computing machine and module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to dynamically adjust delivery locations based on locations of user computing devices, comprising:
by one or more computing devices associated with a delivery system:
receiving an order comprising one or more products for delivery and a shipping address associated with the delivery;
determining a delivery area based on the shipping address, wherein the delivery area comprises a physical area in which the one or more products may be delivered, and wherein the one or more products are scheduled to be delivered directly to a current location of a user computing device associated with the order;
transmitting the delivery area and one or more delivery time windows, each of the delivery time windows comprising a range of time during which the one or more products may be delivered;

receiving, from a merchant computing system, a user confirmation of the delivery area and a user selection of a delivery time window;

at a time at which the delivery time window begins and until delivery, continuously logging the current location of the user computing device and a current location of a delivery agent computing device associated with delivery of the order;

determining, based on the continuously logged current location of the user computing device, that the user computing device is within the delivery area;

determining a route between the location of the delivery agent computing device and the current location of the user computing device and an estimated time of delivery, wherein the route is based on the continuously logged current locations of the delivery agent computing device and the user computing device;

transmitting to the delivery agent computing device the route;

transmitting to the user computing device an alert comprising the estimated time of delivery and advising the user not to leave a specific area before delivery, wherein the specific area is based on the current location of the user computing device at the time the alert is sent;

determining, at a time after transmitting the alert advising the user not to leave the specific area before delivery, a subsequent current location of the user computing device outside of the specific area yet within the delivery area;

determining a subsequent route between the location of the delivery agent computing device and the subsequent current location of the user computing device and a subsequent estimated time of delivery, wherein the subsequent route is based on the continuously logged current locations of the delivery agent computing device and the user computing device;

transmitting to the delivery agent computing device the subsequent route;

transmitting to the user computing device a subsequent alert comprising the estimated time of delivery and advising the user not to leave a subsequent specific area before delivery, wherein the subsequent specific area is based on the subsequent current location of the user computing device at the time the subsequent alert is sent; and receiving, from the delivery agent computing device, a confirmation of delivery of the one or more products to the user at the subsequent current location of the user computing device.

2. The method of claim 1, wherein the user solicits the order, provides the shipping address, confirms the delivery area, and selects the delivery time window via interaction between a merchant website and the user computing device.

3. The method of claim 1, wherein the delivery area is a bounded geographical area and is represented to the user in the form of a map.

4. The method of claim 1, wherein the one or more computing devices are associated with the merchant computing system.

5. The method of claim 1, further comprising:

at a predefined time before the delivery time window begins, transmitting to the user computing device data comprising an alert that the delivery time window is approaching;

continuously logging the current location of the user computing device;

determining that the current location of the user computing device is outside of the delivery area; and transmitting to the user computing device data comprising an alert that the user is outside of the delivery area and must return to within the delivery area to receive delivery.

6. The method of claim 1, further comprising:

at the time between the start of the delivery time window until the delivery, determining, based on the continuously logged current location of the user computing device, that the user computing device is outside of the delivery area;

transmitting to the user computing device one or more of an option to reschedule the delivery, an option to accept delivery at the shipping address provided by the user, or an option to cancel the delivery;

receiving from the user computing device a user selection of one of the transmitted options; and performing, in response to receiving the user selection of the one of the transmitted options, an appropriate action in accordance with the user selection.

7. A computer program product, comprising:

a non-transitory computer-readable medium having computer-readable program instructions embodied thereon that when executed by a computer cause the computer to dynamically adjust delivery locations based on locations of user computing devices, the computer-readable instructions comprising instructions to:

receive, from a merchant computing system, an order comprising one or more products for delivery;

determine a delivery area, wherein the delivery area comprises a physical area in which the one or more products may be delivered, and wherein the one or more products are scheduled to be delivered directly to a current location of a user computing device associated with the order;

at a time at which a delivery time window begins and until delivery, continuously log the current location of the user computing device and a current location of a delivery agent computing device associated with the delivery of the order;

determine, based on the continuously logged current location of the user computing device, that the user computing device is within the delivery area;

determine a route between the current location of the delivery agent computing device and the current location of the user computing device and an estimated time of delivery, wherein the route is based on the continuously logged current locations of the delivery agent computing device and the user computing device;

transmit, to the delivery agent computing device, the route;

transmit, to the user computing device, an alert comprising the estimated time of delivery and advising the user not to leave a specific area before delivery, wherein the specific area is based on the current location of the user computing device at the time the alert is sent;

determine, at a time after transmitting the alert advising the user not to leave the specific area before delivery, a subsequent current location of the user computing device outside of the specific area yet within the delivery area;

determine a subsequent route between the location of the delivery agent computing device and the subsequent current location of the user computing device and a subsequent estimated time of delivery, wherein the subsequent route is based on the continuously logged current locations of the delivery agent computing device and the user computing device;

transmit, to the delivery agent computing device, the subsequent route, wherein a delivery agent associated with the delivery agent computing device approaches the user via the subsequent route with the one or more products;

transmit, to the user computing device, a subsequent alert comprising the estimated time of delivery and advising the user not to leave a subsequent specific area before delivery, wherein the subsequent specific area is based on the subsequent current location of the user computing device at the time the subsequent alert is sent; and receive, from the delivery agent computing device, a confirmation of delivery of the one or more products to the user at the subsequent current location of the user computing device.

8. The computer program product of claim 7, further comprising instructions to:

transmit, to the merchant computing system, the delivery area and one or more delivery time windows, each of the delivery time windows comprising a range of time during which one or more products may be delivered; and receive, from the merchant computing system, a user confirmation of the delivery area and a user selection of a delivery time window.

9. The computer program product of claim 8, wherein the user solicits the order, confirms the delivery area, and selects the delivery time window via interaction between a merchant website and the user computing device.

10. The computer program product of claim 7, wherein the delivery area is a bounded geographical area or any physical location that is less than or equal to a predefined distance from a predefined fixed physical point.

11. The computer program product of claim 7, wherein the computer is associated with the merchant computing system.

12. The computer program product of claim 7, further comprising instructions to:

at a predefined time before the delivery time window begins, transmit, to the user computing device, data comprising an alert that the delivery time window is approaching;

continuously log the current location of the user computing device;

determine that the user computing device location is outside of the delivery area; and transmit, to the user computing device, data comprising an alert that the user is outside of the delivery area and must return to within the delivery area to receive delivery.

13. A system to dynamically adjust delivery locations based on locations of user computing devices, comprising:
a storage device; and
a processor communicatively coupled to the storage device, wherein the processor executes application code instructions that are stored in the storage device to cause the system to:
receive, from a merchant system, an order comprising one or more products for delivery;
determine a delivery area, wherein the delivery area comprises a physical area in which the one or more products may be delivered, and wherein the one or more products are scheduled to be delivered directly to a current location of a user computing device associated with the order;

at a time at which a delivery time window begins and until delivery, continuously log the current location of the user computing device and a current location of a delivery agent computing device associated with the delivery of the order;

determine, based on the continuously logged current location of the user computing device, that the user computing device is within the delivery area;

determine a route between the current location of the delivery agent computing device and the current location of the user computing device and an estimated time of delivery, wherein the route is based on the continuously logged locations of the delivery agent computing device and the user computing device;

transmit, to the delivery agent computing device, the route;

transmit, to the user computing device, an alert comprising the estimated time of delivery and advising the user not to leave a specific area before delivery, wherein the specific area is based on the current location of the user computing device at the time the alert is sent;

determine, at a time after transmitting the alert advising the user not to leave the specific area before delivery, a subsequent current location of the user computing device that is outside of the specific area yet within the delivery area;

determine a subsequent route between the current location of the delivery agent computing device and the subsequent current location of the user computing device and a subsequent estimated time of delivery, wherein the subsequent route is based on the continuously logged current locations of the delivery agent computing device and the user computing device;

transmit, to the delivery agent computing device, the subsequent route;

transmit, to the user computing device, a subsequent alert comprising the estimated time of delivery and advising the user not to leave a subsequent specific area before delivery, wherein the subsequent specific area is based on the subsequent current location of the user computing device at the time the subsequent alert is sent; and receive, from the delivery agent computing device, a confirmation of the delivery of the one or more products to the user at the subsequent current location of the user computing device.

14. The system of claim 13, wherein the processor is further configured to execute computer-readable program instructions stored in the storage medium to cause the system to transmit, to the user computing device, an alert comprising the estimated time of delivery and advising the user not to leave a specific area before delivery, wherein the specific area is based on the location of the user computing device at the time the alert is sent.

15. The system of claim 13, wherein the processor is further configured to execute computer-readable program instructions stored in the storage medium to cause the system to:

transmit, to the merchant system, the delivery area and one or more delivery time windows, each of the delivery time windows comprising a range of time during which the one or more products may be delivered; and receive, from the merchant system, a user confirmation of the delivery area and a user selection of a delivery time window.

16. The system of claim 13, wherein the delivery area is a bounded geographical area or any physical location that is less than or equal to a predefined distance from a predefined fixed physical point.

* * * * *